June 22, 1937.  C. BREER  2,084,572
AUTOMOTIVE VEHICLE
Original Filed June 8, 1933  3 Sheets-Sheet 1

INVENTOR.
CARL BREER.
BY
ATTORNEYS.

June 22, 1937. C. BREER 2,084,572
AUTOMOTIVE VEHICLE
Original Filed June 8, 1933  3 Sheets-Sheet 2
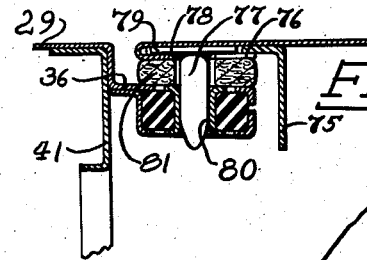
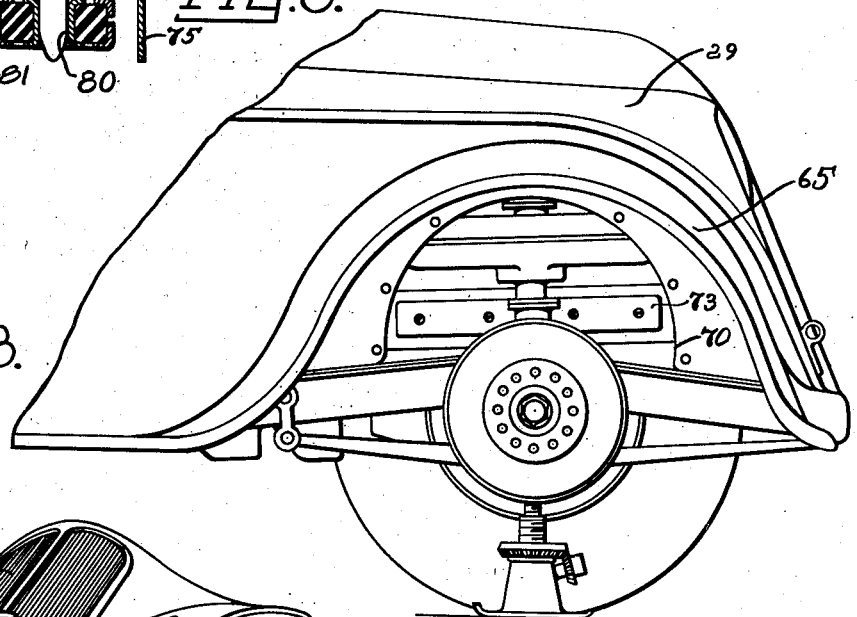
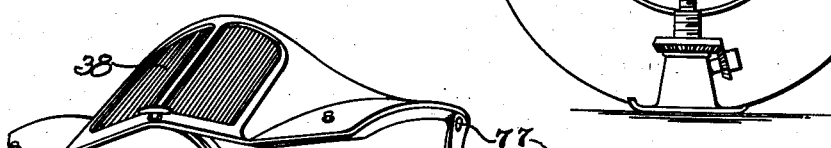
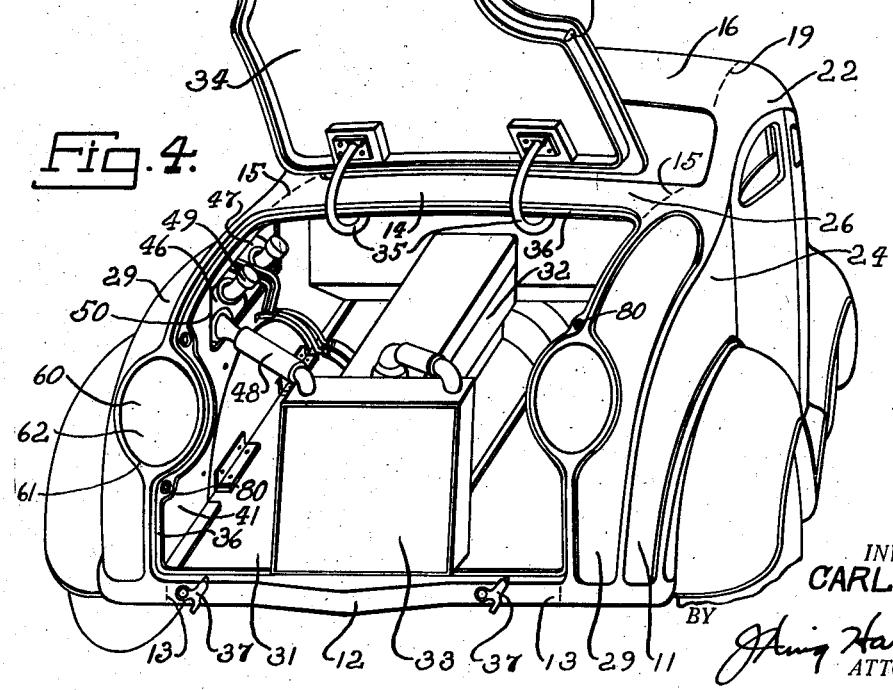
INVENTOR.
CARL BREER.
BY
ATTORNEYS.

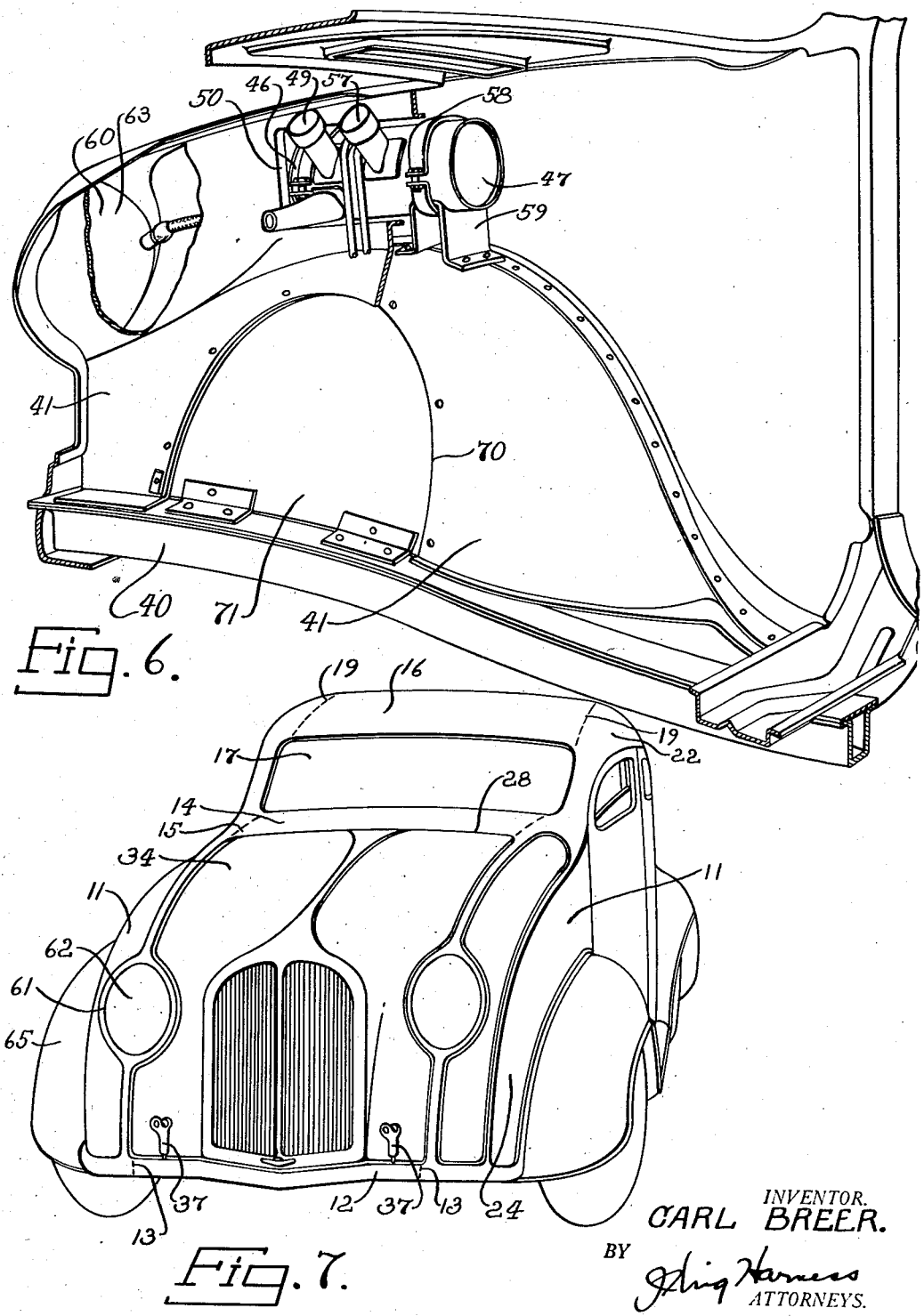

Patented June 22, 1937

2,084,572

UNITED STATES PATENT OFFICE 2,084,572

AUTOMOTIVE VEHICLE

Carl Breer, Detroit, Mich., assignor to Chrysler Corporation, Detroit, Mich., a corporation of Delaware Application June 8, 1933, Serial No. 674,835
Renewed December 17, 1936

38 Claims. (Cl. 296—28)

My invention relates to automotive vehicles and it has particular relation to a novel association of the body parts with the operative parts enclosed thereby.

One object of my invention is to provide a novel type of body design wherein a unitary body extends from end to end of the car, providing a maximum degree of rigidity with a minimum of weight.

An additional object of my invention is to provide a novel means of securing access to the valve mechanism of an automobile for purposes of adjustment, inspection and the like.

A further object of my invention is to provide a novel type of engine compartment cover and a novel arrangement of the frontal portions of the body and the engine compartment cover whereby the cover lends rigidity to the frontal portions of the body.

An additional object of my invention resides in providing a novel combination of automobile body and headlights therefor.

Another object of my invention is to provide a novel type of automobile body construction affording storage space adjacent the engine compartment but outside of the confines thereof for the reception of various members which operate in conjunction with the power plant of the automobile.

Another object of my invention resides in providing a novel arrangement of an automobile body and the front wheel housings and fenders.

Another object of my invention consists in providing a body for automobiles having a novel type of frontal portion.

Heretofore it has been customary, in the construction of automobiles, to mount the body on the rear end of the chassis frame, mount the engine and its auxiliary equipment, including a radiator, on the front end of the chassis frame, and cover the engine with a hood. The hood is generally made up of two or more parts, which are hinged together, the front ends of which fit loosely against a flange on the radiator shell and the rear ends of which fit loosely on the front end of the cowl of the body, which terminates a short distance from the windshield. Clamps secure the side edges of the hood to the chassis frame. Front fenders are mounted on the chassis frame independently of the hood. Headlights are mounted between the radiator shell and the front fenders by rods mounted on the chassis frame or fenders. In this type of construction, which has been very general, each of the units is separately mounted on the chassis frame and, as a result, are movable relative to each other, and each constitutes an independent weight on the chassis frame. As it is desirable that the entire car assembly be rigid as a unit, and as the various units are held in their proper relative positions by being secured at various points along the chassis frame, a very rigid and therefore heavy chassis frame is necessary.

By my invention I have improved this condition by extending an integral body from one end of the chassis frame to the other end, thus materially increasing its rigidity, by securing the wheel housings and fenders to the body and to the chassis frame to add longitudinal rigidity thereto, and by employing a relatively flat single piece engine compartment cover so disposed as to lend both lateral and longitudinal rigidity to the cowl extensions. By means of these changes I am enabled to both produce a more rigid unitary structure and to reduce the weight thereof, as most of the units serve to reinforce the chassis frame instead of merely adding spaced weights thereto, thus permitting the employment of a lighter frame. In addition, by placing the headlights within the cowl extension and by disposing the front wheel housings at least partially within the cowl extensions, I have provided a body structure which is pleasing in appearance, which offers a reduced resistance to head winds, in which each part lends rigidity to the associated parts, and in which relative movement of associated parts is eliminated, thus materially reducing the possibility of squeaks, unnecessary wear, vibration, and the like.

For a better understanding of my invention, reference may now be had to the accompanying drawings, of which:

Fig. 3 is a side elevational view of a portion of the structure illustrated in Figs. 1 and 2 with the right front wheel and the associated wheel housing panel removed therefrom for the benefit of clarity of illustration.

Fig. 4 is a front elevational view of the structure illustrated in Fig. 1 with the engine compartment cover in its raised position.

Fig. 5 is a detail cross-sectional view illustrating the position of one of the anchoring pins when the engine compartment cover is in its closed position.

Fig. 6 is a view, partially in section and partially in elevation, of a part of the frontal portion of an automobile body constructed in accordance with my invention with a portion of the inner side wall of the auxiliary compartment omitted for the sake of clearness and illustrating the relation of the frontal portion with the head lights, the wheel housing panel and the auxiliary compartment.

Fig. 7 is a front elevational view of an automobile embodying my invention with the engine compartment cover in its closed position.

Figure 1:
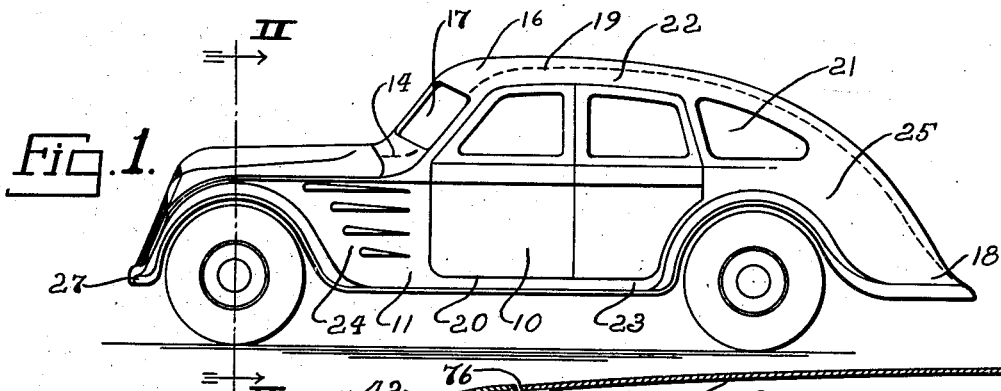
Fig. 1 is a side elevational view of an automobile vehicle embodying my invention.

In the drawings I have illustrated an automobile body 10, constructed in a novel manner. This body essentially comprises two sheet metal side members 11, which extend from end to end of the car, and are connected together by three transversely extending members, a metallic front apron 12, which is welded or otherwise suitably secured to the side members 11 along the lines indicated at 13, a sheet metal central cowl panel 14, welded or otherwise suitably secured to the side members 11 along lines indicated at 15, and a sheet metal central top panel 16, which extends from the top of a windshield opening 17 to the extreme rear end of the car, as indicated at 18, and which is welded or otherwise suitably secured to the side members 11 along lines indicated at 19.

The side members 11 are each provided with openings 20 and 21, for doors and a window respectively, which are centrally disposed in a vertical direction, thus leaving upper and lower members 22 and 23 respectively interconnecting the front and rear portions 24 and 25, respectively, of the side members 11. The upper edges of the upper member 11 are curved inwardly into the plane of the top of the car, and form the corner of the roof thereof, thus permitting the use of a central roof panel which is substantially horizontal in transverse section. The central roof panel may be divided into several sections, but if so, they should be rigidly secured together, as by welding, as the top panel aids materially in lending both longitudinal and transverse stability to the side members 11.

The front portions 24 of the side members 11, together with the central panel 14, constitute the cowl of the car. The top edge of the front portions 24 are curved inwardly so that they extend in a substantially horizontal plane, so that the central panel 16 is substantially horizontal throughout its length. The panel 16 and the front portions 24 thus unite to form a unitary cowl 26 which extends transversely across the front of the car in front of the windshield, down the side of the car to the running board and fender and forwardly along each side of the car to the extreme front end thereof, as indicated at 27.

Figure 2:
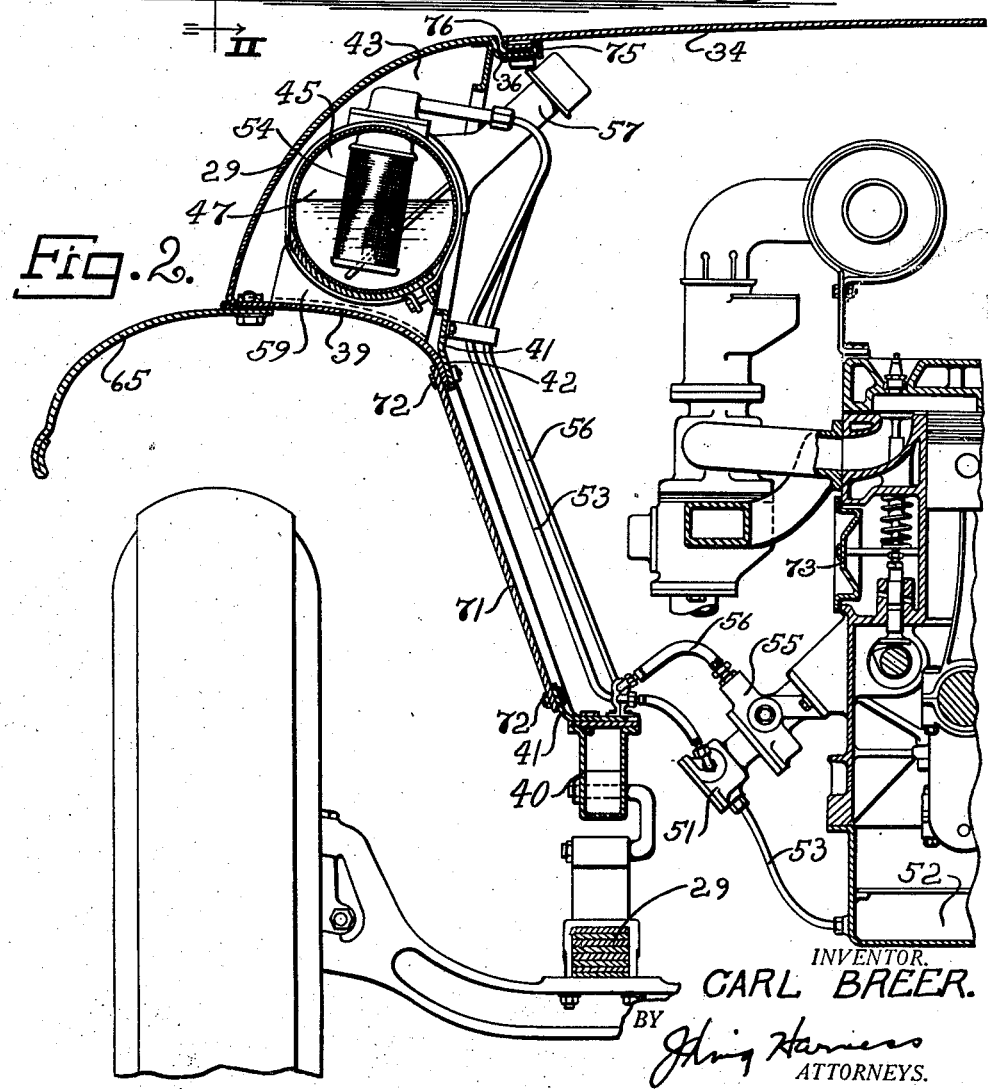
Fig. 2 is a fragmentary transverse cross-sectional view of a portion of the structure illustrated in Fig. 1, the section being taken along the line II—II thereof.

The front central portion of the cowl 26 is cut away, as indicated at 28, leaving side portions 29, which are arcuate in transverse cross section, as best shown in Fig. 2, extending forwardly and then downwardly to the front extremity of the car, indicated at 27. The cut-away portion of the cowl, as indicated at 28, affords access to an engine compartment 31 within which is disposed an engine 32 and an associated radiator 33, disposed at the front end thereof. This compartment is closed by means of a cover 34, which is hinged at its rear end to the central cowl panel 14 by means of hidden hinge members 35. The cover 34, when in its closed position, rests upon a ledge 36 which extends across the front edge of the cowling 26 adjacent the cut-away portion 28, forwardly therealong to the front extremity 27 of the portions 29. The lower front edge of the cover 34 is secured, by means of fastening members 37, to the transverse member 12. The rear portion of the cover 34 slopes gently forward to approximately the front edge of the radiator 33 and thence downwardly to the transverse member 12. A radiator grill 38, of any desired configuration, constitutes a frontal portion of the cover 34. The main body portion of the cover 34 is comparatively flat, in both longitudinal and transverse section.

The lower edge of the cowl portions 29 is bent inwardly, as shown at 39, to constitute a portion of the upper surface of the front wheel housing, as shown in Fig. 2, thus placing the wheel housing partially within the lateral confines of the front end of the cowl.

The side portions 29 of the cowl 26 are each secured to a chassis frame member 40 by means of plates 41. These plates are preferably bolted at their lower edges to the frame 40, extend angularly upwardly to constitute the side portions of the front wheel housings, and then substantially vertically into engagement with the inner edge of the portions 29 adjacent the ledge 36. The top of these members 41 may be welded, bolted, or otherwise secured to the member 29, as may be desired. The inwardly bent portion 39 of the cowl portion 29 is secured to the plate 41 at a point 42, preferably by welding. Thus, the members 29 with their inwardly bent portions 39, together with the upper portion of the plate 41, form an enclosure or compartment 43, of substantially triangular cross-section, at each side of the car which may be used as a place of mounting for various kinds of equipment associated with the engine.

In the structure as illustrated, I have disposed a tank 45 divided into two sections, 46 and 47, in the compartment 43. The front section 46 is connected with the radiator 33 by means of a hose connection 48 and serves to carry the water or other cooling fluid normally carried in the header at the top of the radiator, which is of the transverse flow type. The radiator is connected at top and bottom to the engine in the usual manner, and is kept constantly filled by the liquid in the tank 46. The tank 46 may be filled through a filling spout 49 which extends through an opening 50 in the wall member 41 so that access may be had to the spout 49 to fill the tank by raising the engine cover 34. The section 47 of the tank 45 constitutes a portion of the lubricating circuit of the engine. A pump 51, mounted on and driven by the engine, serves to pump oil from a sump 52 in the crankcase of the engine through conduits 53 into a filter 54 in the tank 47. Oil is drawn from the lower portion of the tank 47 by means of a second pump 55, also driven by the engine, through conduits 56, and again returned to the various lubricant conducting passages of the engine. The tank 47 is provided with a filling spout 57, which also projects through the opening 50 into the engine compartment, by which oil may be added thereto. Access to the spout 57 is gained by raising the engine compartment cover 34. This arrangement eliminates from the engine compartment various portions of the equipment normally placed therein, permitting the engine compartment to be made smaller if desired, or permitting more freedom of access to the various parts of equipment disposed therein. The tank 45 may be rigidly mounted in the compartment 43 by means of clamps 58 and supports 59, or any other suitable type of supporting device. The walls of each enclosure 43 extend approximately from the adjoining front end portions of the chassis frame, body and associated spring, as shown in Fig. 3, providing a rigid hollow beam whereby at least a portion of the forces incident to the load, weight and shock at the front end of the vehicle are transmitted rearwardly to the body independently of the chassis.

The front portion of the compartment 43 may be utilized as a container for the main body portion, or reflectors, of headlights 60. The front portions 29 of the cowl 26 are provided with openings 61 in which are disposed the headlight lenses 62, and the headlight reflectors 63 extend rearwardly into the compartment 43, as best shown in Fig. 6. Access may be had to the connections and adjusting equipment of the headlight 60 at the rear portion of the reflector through suitable openings in the wall 41.

The front fenders 65 are each secured at their inner edges to the inwardly bent portions 39 of the side portions 29 of the cowl so that the fenders 65, the portions 39 and the side walls 41 unite to form wheel housings which are disposed beneath and partially within the side portions 29 of the cowl.

In order to provide ready access to the intake and exhaust valves of the engine, for purposes of adjustment, inspection and repair, I have provided an opening 70 in the adjacent wall member 41. This opening is normally sealed by means of a wheel housing cover plate or panel 71 which is secured to the edges of the openings by means of bolts 72 which, together with the panel 71, may be removed from within the wheel housing. This panel may be made very rigid so that, when bolted to the plate 41, it constitutes a part of a rigid frame reinforcing structure. When it is desired to adjust the valves of the engine the left front wheel of the car is raised by means of a jack or other suitable equipment, the wheel removed and the bolts 72 removed, thus permitting removal of the plate 71, which gives access to a valve cover plate 73, thus eliminating the necessity of adjusting the valves from a position above the engine which is extremely difficult owing to the limited space, the fact that the valves cannot be seen by the repairman except with difficulty, and the fact that the engine is always warm when the valves are adjusted. With this construction the valves are more readily adjusted than in the present standard hood covered engine.

The engine compartment cover 34 has secured thereto a flange 75 extending at right angles thereto which lends it rigidity in a longitudinal direction, as best illustrated in Fig. 5. The edge portion of the cover 34 is doubled upon itself, forming a flange, as indicated at 76. A plurality of anchor pins 77 project through openings 78 in the flange 76 and are held in position by having heads 79 thereof disposed between the cover 34 and its flange 76. When the cover is in its closed position these pins extend into openings 80 in the ledge portion 36 of the side portions 29 of the cowl. These pins serve to form a rigid connection between the cover 34 and the side portions 29, thus rigidly securing together in a transverse direction the two side portions 29. In order to prevent noise due to slight movements of the cover 34 with respect to the ledge 36, a collar 81 composed of rubber or other suitable insulating material is disposed around the pin 77 between the flange portion 76 and the ledge 36.

Observing the car in side view, it will be apparent that the side members 11 each serves as a truss lending rigidity to the entire structure in a vertical direction. In so doing, the lower member 23 of the side 11 serves as a tension member and the upper member 22, which includes the front A post, as a compression member. The lower member is secured to and reinforced by the running board of the car and the top member 22 is secured to and reinforced by the top panel 16.

As illustrated, the side members 11 of the car body are integral from end to end. If desired, this side member may be made in sections, so that portions thereof may be replaced in instances where one section has become damaged. Where these side members are made in sections it is essential, however, that they be rigidly secured together into a single unitary structure in order to properly reinforce the frame of the car.

From the foregoing description it will be apparent that the body portion of my car constitutes a unitary member throughout and extends from the front extremity to the rear extremity of the car. It will also be apparent that by providing a cowl which extends to the extreme front edge of the car I have produced a longitudinal rigidity which is totally absent in cars in which the body portion extends only to the rear portion of the engine. Furthermore, the provision of the storage space within the forwardly extending portions of the cowl provides means for mounting the headlamps in such position that they do not interfere with the streamlining of the car which, together with the fact that the wheel housings are disposed partially within the forwardly extending portions of the cowl, aid materially in reducing the head wind resistance of the car.

Although I have illustrated but a single form of my invention and have described in detail but a single application thereof, it will be apparent to those skilled in the art that my invention is not so limited but that various changes and modifications may be made therein without departing from the spirit of my invention or from the scope of the appended claims.

What I claim is:

1. A unitary body for an automobile comprising two spaced members adapted to form the sides of the body and of equal length with the automobile, a roof member interconnecting the top portions of said side members and extending to the rearmost end of the automobile, a cowl panel spaced from said roof member and interconnecting said side members, and a transversely extending front member spaced from said cowl panel and interconnecting said side members.

2. A unitary body for an automotive vehicle having fenders attached thereto comprising two spaced substantially vertically disposed unitary sheet metal side members each extending substantially the full height of the body and from the front end of the front fender to the rear end of the rear fender and having its upper edge turned inwardly into a substantially horizontal plane, a sheet metal roof panel rigidly secured to the inturned edges of said side members and substantially horizontal in transverse section, a substantially horizontal cowl panel rigidly secured to the inturned edges of said side members, and a substantially horizontally disposed member disposed at the front end of said side members and rigidly secured to each of them.

3. An automotive vehicle having a body of the closed type comprising a passenger compartment and a front engine compartment and the body comprising two spaced sheet metal side members each constituting one complete side of the passenger compartment and having integral portions extending substantially the full length of the engine compartment and constituting a portion of the cowl of the vehicle, said forwardly extending portions each comprising a portion of the exterior of the car body and having integral portions bent inwardly to constitute a portion of a front wheel housing.

4. An automotive vehicle having a frontal portion comprising a cowl member extending transversely across the body and from the windshield to the extreme front end of the vehicle, and front wheel housings disposed at least partially within said cowl member and rigidly secured thereto.

5. An automotive vehicle having a frontal portion comprising a cowl member extending transversely across the car and having side portions extending to the front end of the car, and front wheel housings disposed at least partially within the lines representing the outer edges of said cowl side portions and secured to said portions.

6. An automotive vehicle having a frontal portion comprising a cowl member extending transversely across the car and having side portions extending to the front end of the car, and front wheel housings secured throughout substantially their entire lengths to said cowl side portions.

7. An automotive vehicle body having a frontal portion comprising a cowl portion extending to the front end of the vehicle, a front headlight disposed within said cowl portion, and an aperture in said cowl portion registering with said headlight.

8. An automotive vehicle body having a frontal portion comprising a cowl member extending transversely across the body and from the windshield to the extreme front end of the vehicle, front headlights disposed within said cowl, apertures in said cowl registering with said headlights, and front wheel housings disposed at least partially within said cowl member and secured thereto.

9. In an automotive vehicle, an engine compartment, a wheel housing, and means for securing access to said engine compartment through said wheel housing.

10. An automotive vehicle comprising a body, wheels supporting said body and partially enclosed thereby, and an engine enclosed by said body, said body being provided with an aperture in the portion enclosing one of said wheels to afford access to said engine.

11. An automotive vehicle having a body supported on wheels, an engine adapted to propel certain of said wheels, wheel housings secured to said body and partially enclosing said wheels, one of said housings being provided with an aperture providing access to said engine, and a removable cover adapted to close said aperture.

12. An automotive vehicle having a body supported on wheels, an engine adapted to propel certain of said wheels, a housing partially enclosing one of said front wheels and constituting one wall of an engine compartment, an aperture in said wall between said engine and said wheel, and a removable cover adapted to close said aperture.

13. An automotive vehicle having a body supported on wheels, an engine adapted to propel certain of said wheels, a housing partially enclosing one of said front wheels and constituting one wall of an engine compartment, an aperture in said wall between said engine and said wheel, and a removable cover adapted to close said aperture, said cover being rigid and being rigidly secured to said wall at the edge of said aperture.

14. An automotive vehicle having an engine compartment formed of two spaced side walls and an interconnecting top wall, said side walls each constituting a portion of a wheel housing and provided with an opening for accommodating access to the interior of said engine compartment through said wheel housing.

15. A body for an automotive vehicle having a frontal portion comprising a cowl member extending transversely across the body and from the windshield forwardly to the front end of the vehicle then downwardly to the lower front edge thereof, front wheel housings disposed at least partially within said cowl portion, headlights disposed within said cowl portion, and apertures in said cowl adjacent said headlights, an opening in the front central portion of the cowl member to provide access to the space encompassed by the cowl member, and a removable cover adapted to close said opening, said cover being provided with an opening in the central portion of its front end for the passage of cooling air therethrough.

16. A body for an automobile having a frontal portion comprising a cowl extending transversely across the body and having two spaced side portions extending forwardly to the front edge of the automobile, spaced side walls secured at their tops to the inner edges of the side portions of the cowl and adapted to define an engine compartment, a hood member adapted to engage the inner edges of the side portions of the cowl and form a cover for said engine compartment, front wheel housings disposed at least partially within said side portions of the cowl, said housings being secured to the lower edge of the side portions of the cowl and to the adjacent side wall to form compartments between the wheel housings, the side walls and the side portions of the cowl.

17. A body for an automobile having a frontal portion comprising a cowl portion extending transversely across the body and having two spaced side portions extending forwardly to the front edge of the automobile, spaced side walls secured at their tops to the inner edges of the side portions of the cowl and adapted to define an engine compartment, a hood member adapted to engage the inner edges of the side portions of the cowl and form a cover for said engine compartment, front wheel housings disposed at least partially within said side portions of the cowl, said housings being secured to the lower edge of the side portions of the cowl and to the adjacent side wall to form compartments between the wheel housings, the side walls and the side portions of the cowl, an aperture in one of the side walls beneath the line of union therewith of the wheel housing adapted to establish communication between the engine compartment and the space beneath the wheel housing, and a cover adapted to close said opening.

18. A body for an automobile having a frontal portion comprising a cowl portion extending transversely across the body and having two spaced side portions extending forwardly to the front edge of the automobile, spaced side walls secured at their tops to the inner edges of the side portions of the cowl and adapted to define an engine compartment, a hood member adapted to engage the inner edges of the side portions of the cowl and form a cover for said engine compartment, front wheel housings disposed at least partially within said side portions of the cowl, said housings being secured to the lower edge of the side portions of the cowl and to the adjacent side wall to form compartments above the wheel housings, an aperture in one of the side walls beneath the line of union therewith of the wheel housing adapted to establish communication between the engine compartment and the space beneath the wheel housing, and a cover adapted to close said opening, said cover being removable from the wheel housing side of said plate.

19. A body for an automobile having a frontal portion comprising a cowl portion extending transversely across the body and having two spaced side portions extending forwardly to the front edge of the automobile, spaced side walls secured at their tops to the inner edges of the side portions of the cowl and adapted to define an engine compartment, a hood member adapted to engage the inner edges of the side portions of the cowl and form a cover for said engine compartment, front wheel housings disposed at least partially within said side portions of the cowl, said housings being secured to the lower edge of the side portions of the cowl and to the adjacent side wall to form compartments above the wheel housings, a tank in said last mentioned compartment, and a filling spout connected to said tank and extending into said engine compartment.

20. An automotive vehicle body having a frontal portion comprising a cowl portion extending transversely across the body and having two side portions extending forwardly and then downwardly to the lower front edge of the vehicle, a radiator shell disposed intermediate said side portions of the cowl, an engine hood pivotally secured to said cowl and adapted to engage the inner edges of said cowl side portions throughout their lengths, said hood having an opening in the front central portion adapted to register with the radiator shell when the hood is in its closed position.

21. A body for an automobile having a frontal portion comprising a cowl portion extending transversely across the body and having two side portions extending forwardly and then downwardly to the lower front edge of the automobile, a radiator disposed intermediate said side portions of the cowl, an engine hood pivotally secured to said cowl and adapted to engage the inner edges of said cowl side portions substantially throughout their lengths, said hood having an opening in the front central portion adapted to register with the radiator when the hood is in its closed position, and means secured to the front edge of said hood adapted to secure the same in its closed position.

22. In an automotive vehicle, an engine housing defining an engine compartment, a wheel housing defining a wheel compartment adjoining said engine compartment, and a wall separating said compartments and provided with an opening establishing communication between said compartments for accommodating access to said engine through said wheel compartment.

23. In an automotive vehicle body of the closed type having a door opening in each side, two spaced unitary sheet metal side members each comprising an upper edge portion of maximum height over the door opening and extending downwardly at both ends to the front and rear ends of the vehicle, and a lower edge portion having an intermediate part extending substantially longitudinally of the body beneath the door openings and having a forward part curved upwardly and inwardly over the front wheel axle.

24. In an automotive vehicle body of the closed type having a door in each side, two spaced unitary sheet metal side members each comprising an upper edge portion of maximum height over the door opening and extending downwardly at both ends to the front and rear ends of the vehicle, and a lower edge portion having an intermediate part extending substantially horizontally beneath the door openings and having a forward part curved upwardly over the front wheel axle and then downwardly and inwardly to the front end of the vehicle.

25. An automotive vehicle body comprising two spaced forwardly extending side members having spaced inwardly projecting cowl portions extending longitudinally of said vehicle substantially to the front extremity thereof, a removable hood member disposed between said cowl portions, headlights and front wheel housings disposed at least partially within said cowl portions, said hood member, side members, headlights, cowl portions and wheel housings each presenting surfaces exposed to a head-on air stream which cooperate to form a streamline shape nose portion of the vehicle devoid of obstructions preventing uninterrupted smooth air flow over all of said exposed surfaces.

26. An automotive vehicle body comprising two spaced forwardly extending side members having spaced inwardly projecting cowl portions extending longitudinally of said vehicle substantially to the forward-most extremity thereof, a removable hood member disposed intermediate said cowl portions, headlights, cowl portions and front wheel housings disposed at least partially within said cowl portions, said hood member, side members, headlights and wheel housings each presenting surfaces exposed to a head-on air stream which unite to form a front end portion over all portions of which an air current adhering to the several surfaces may flow successively without reversal of direction.

27. In an automotive vehicle, two forwardly extending side portions, a headlight disposed at least partially within each said side portions and projecting therefrom towards the opposite side of the vehicle, and a cover member disposed intermediate said side portions and movable with respect thereto, said cover member having an edge portion conforming with the inner edge of one of said side members and having a recess therein, the edges of which conform to the contour of the portion of the headlight projecting inwardly from the side portions.

28. A unitary body for a closed automotive vehicle comprising two spaced side members each including inwardly extending top portions and having laterally spaced inner edge portions constituting a substantial part of the top extremity of said body and extending the complete length of the vehicle, and transversely extending body portions having substantially smaller transverse dimensions than the corresponding dimensions of said body and interconnecting the inwardly extending top portions of said side members.

29. A closed body for an automotive vehicle having a chassis frame and comprising two spaced substantially vertically disposed unitary side members extending from end to end of the frame and having their upper edge portions arcuately bent toward each other into substantially horizontal planes and constituting a substantial part of the top extremity of said body, and spaced substantially horizontal transversely extending members of smaller transverse dimensions than the corresponding dimensions of said body and including a roof member rigidly connecting said side members together at certain of their upper bent edges.

30. An automotive vehicle having a frontal portion comprising a cowl member extending transversely across the body and having spaced inwardly protruding cowl side portions extending from said transverse cowl member to the front extremity of said vehicle and constituting at least a part of the top of said frontal portion, and a hood member movably mounted between said cowl side portions.

31. An automotive vehicle having a frontal portion including a cowl member extending transversely across the body and having spaced inwardly extending cowl side portions extending from said cowl member to the front extremity of said vehicle, the front parts of said cowl side portions being curved downwardly and providing at least a part of the frontal area of said vehicle, and a movable closure between said cowl side portions.

32. A closed body for an automotive vehicle including a passenger compartment, a frontal portion comprising a cowl member extending transversely of said body and side cowl portions extending longitudinally of said body to the front extremity thereof, and means including internal panelling associated with said forwardly extending side cowl portions and providing a pair of laterally spaced hollow beam structures extending upwardly and rearwardly from the front end portion of the body toward said compartment.

33. A closed body for an automotive vehicle including a passenger compartment, a pair of laterally spaced hollow beam structures extending upwardly and rearwardly from the front end portion of the body toward said compartment, and a pair of wheel housings one associated with each of said hollow beam structures and having wall portions common with part of the wall portions thereof.

34. A closed body for an automotive vehicle including a passenger compartment, a pair of laterally spaced hollow beam structures extending upwardly and rearwardly from the front end portion of the body toward said compartment, a wheel housing associated with each of said hollow beam structures, means providing an engine compartment between said beam structures, portions of the walls of said beam structures, wheel housing and engine compartment being common with each other.

35. A closed body for an automotive vehicle having a chassis frame and supporting springs including a pair of laterally spaced hollow beam structures, each structurally fixed at its front end portion to the forward end portion of said chassis frame in close proximity to the junction thereof and one end of one of said springs and extending upwardly and rearwardly from the front end portion of the body toward the compartment thereof for transmitting at least a portion of the forces incident to the load, weight and shock applied at the front of the vehicle to said body independently of said chassis.

36. An automotive vehicle body comprising two side portions extending forwardly, wall portions spaced from and cooperating with said side portions in forming a chamber therebetween, a headlight mounted in each of said chambers, respectively, and each having an external light outlet disposed at least partially within an opening in one of said side portions, and a readily movable hood member disposed intermediate said side portions and adapted to be moved to afford access to the rear portions of said headlights.

37. In a motor vehicle metal body structure having a driver's compartment, a front wheel supporting structure extending forwardly of said compartment and including a frame structure constructed and arranged to mount said wheels and the motor vehicle power plant, a pair of laterally spaced compression beam structures disposed respectively at the sides of the body and projecting forwardly and downwardly from said compartment to substantially the front end portions of said frame structure at opposite sides of said power plant, and means extending rearwardly from said compression structures and frame structure at the top and bottom of said compartment at each side of the body constructed and arranged to transmit loads from said compression structures and frame structure to substantially the rear end of the body, one of said load transmitting means including an outer surface load sustaining body panel extending from one of said compression beam structures to substantially the rear end of the body structure, said body structure having its rear end sloping rearwardly and downwardly to bring together said top and bottom load transmitting means at substantially the rear end of the body.

38. In a motor vehicle metal body structure having a driver's compartment, a front wheel supporting structure extending forwardly of said compartment and including a frame structure constructed and arranged to mount said wheels and the motor vehicle power plant, a pair of laterally spaced compression beam structures disposed respectively at the sides of the body and projecting forwardly and downwardly from said compartment to substantially the front end portions of said frame structure at opposite sides of said power plant, and means extending rearwardly from said compression structures and frame structure at the top and bottom of said compartment at each side of the body constructed and arranged to transmit loads from said compression structures and frame structure to substantially the rear end of the body, one of said load transmitting means including an outer surface load sustaining body panel extending from one of said compression beam structures to substantially the rear end of the body structure, said body structure having its rear end sloping rearwardly and downwardly to bring together said top and bottom load transmitting means at substantially the rear end of the body, and a power plant hood cover hingedly supported at its rear end forwardly of said compartment, said hood cover being disposed between said spaced compression beam structures.

CARL BREER.